Dec. 1, 1953   H. W. HEIN   2,660,976
SIGNALING DEVICE FOR VACUUM MILKING MACHINES
Filed Dec. 7, 1951
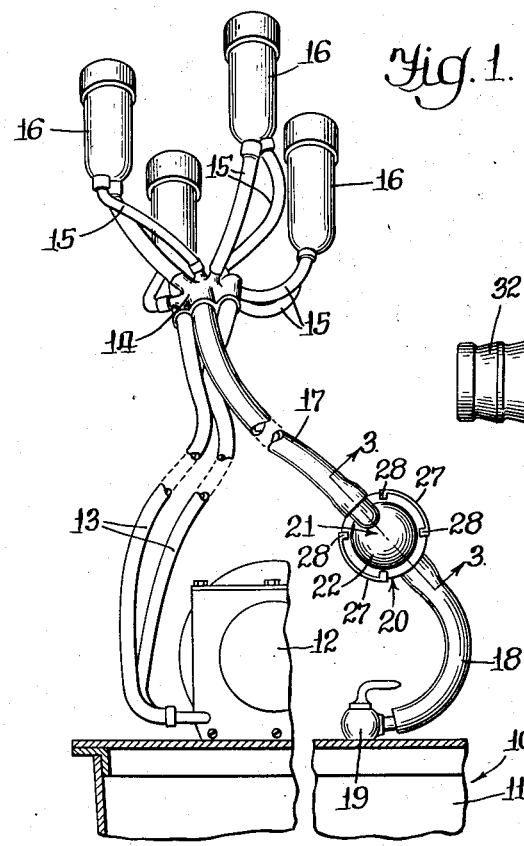
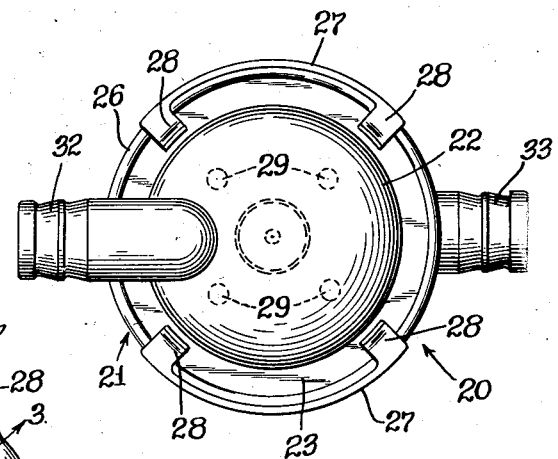
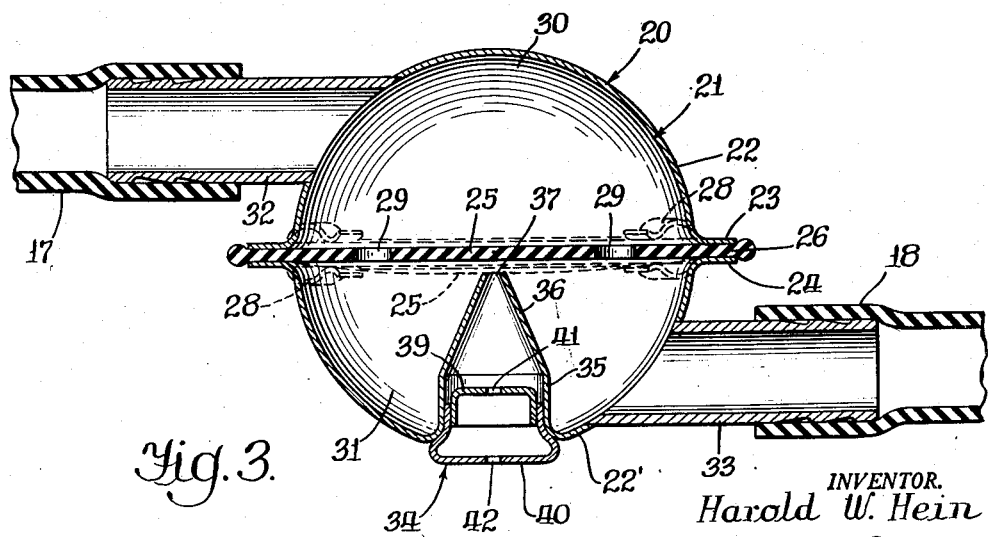
INVENTOR.
Harold W. Hein
BY Paul O. Pippel
Atty.

Patented Dec. 1, 1953

2,660,976

UNITED STATES PATENT OFFICE 2,660,976

SIGNALING DEVICE FOR VACUUM MILKING MACHINES

Harold W. Hein, Chicago, Ill., assignor to International Harvester Company, a corporation of New Jersey Application December 7, 1951, Serial No. 260,472

7 Claims. (Cl. 116—112)

This invention relates to an improved signalling device for a vacuum controlled milking machine. More specifically it relates to a vacuum operable signalling device adapted to be connected in the milk line of a milking machine or parlor milking system for emitting a warning signal when the cow has reached the end of the milking period.

In a vacuum operated milking machine, the machine subjects the teats of the cow to the milking action until the operator has determined that the cow has been milked out whereupon he then stops the action of the machine. Generally the operator has some knowledge as to the quantity that the individual cow gives and the time which it takes to completely milk out the udder of the animal. This information, however, is at best inaccurate and since the cow's timing may vary from day to day it frequently occurs that the milking machine is left in operation for a greater period than necessary. The continued vacuum action on the teats of the animal after the milk has been depleted can have serious consequences on the health of the animal. It is a prime object, therefore, of this invention to provide an improved signalling device which can be placed in the milk line of the milking machine and which will be responsive to the flow of milk for emitting a signal when the milk flow has stopped from the udder of the animal.

It is another object to provide an improved signalling device for milking systems, the device comprising a casing having a flexible membrane suspended within the casing to divide the casing into an inlet chamber and an outlet chamber, the membrane having an opening providing for continual communication between the inlet and outlet chambers, the casing further including a signalling device which is rendered inoperative when milk flows from the inlet chamber to the outlet chamber through the openings of the flexible membrane.

A still further object is to provide a signalling device for milking machines, the device including a flexible membrane which is stretched between an inlet and an outlet chamber, the flexible membrane having openings providing for communication between the chambers, the outlet chamber including a whistle having an opening normally in communication with the outlet chamber when the milk flow ceases whereupon the whistle emits an audible signal, the flexible membrane being operable to seal the opening of the whistle during the milking period when milk flows through the flexible membrane from the inlet chamber to the outlet chamber.

These and further objects will become more readily apparent upon a reading of the specification when taken in connection with the accompanying sheet of drawings.

In the drawing:

Figure 1 is a perspective view of a milking machine showing a signalling device positioned in the milk line of the machine.

Figure 2 is an enlarged plan view of a signalling device.

Figure 3 is an enlarged sectional view in elevation through a signalling device.

Referring now particularly to Figure 1, a milking machine is generally designated by the reference character 10. The milking machine 10 includes a conventional type of milk can 11 on which a pulsator 12 is positioned. The pulsator 12 may be of conventional design for alternately subjecting the teats of the cow to vacuum and atmosphere through vacuum and air hoses 13 which are in connection with a milker claw 14. The milker claw 14 has connected thereto a plurality of short flexible hoses 15 to which are connected teat cups 16. A section of milk hose 17 is connected to the milker claw for discharging milk from the claw to a short section of tubing 18 which has one end connected to a milk cock 19 for delivering milk to the milk can 11.

The milking machine 10 which is shown here is of conventional design and operation. A signalling device, generally designated at 20, is connected to the milk hoses 17 and 18 as shown in Figures 1 and 3.

The signalling device 20 comprises a casing 21 consisting of shell portions 22 and 22'. The shell portions 22 and 22' each have outwardly extending peripheral flanges 23 and 24. A flexible membrane 25 of rubberlike material has its peripheral edge 26 positioned between the flanges 23 and 24. A pair of spring clips 27 are positioned on opposite sides of the casing 21. The spring clips 27 include spring fingers 28 which tightly clamp the peripheral edges 23 and 24 in sealing engagement with the peripheral edge 26 of the flexible membrane 25. The flexible membrane 25 includes a plurality of openings 29 which provide for communication between an inlet chamber 30 and an outlet chamber 31. The inlet chamber 30 is in communication with an inlet connection 32 which is engaged by the flexible milk hose section 17. The outlet chamber 31 is in communication with an outlet connection 33 which is in engagement with the flexible milk hose connection 18.

The shell 22' is provided with an integral inwardly extending tubular valve member 35 having a funnel-shaped wall 36 terminating in a port or opening 37 which is positioned in spaced relation immediately below the flexible membrane 25. The tubular member 35 securely supports a whistle 34 which is formed by a pair of cup-shaped elements 39 and 40 which are positioned in opposed telescoping relation. The cup-shaped elements include openings 41 and 42 which are in alinement with each other and with the port or opening 37.

In the operation the signalling device 20 is interposed between the milk lines 17 and 18. In view of the vacuum existing within the milk can 11 the inlet chamber 30 and outlet chamber 31 are also under a vacuum depression. Milk flows from the claw 14 through the flexible hose 17 into the inlet chamber 30 whereupon the milk under a relatively high velocity flows through the openings 29 into the outlet chamber 31 and from there through the outlet connection 33 and hose 18 to the milk can 11. The membrane 25 is flexible and may be made of a suitable rubber composition. As the milk flows through the openings 29 the rubber membrane 25, which is tightly stretched across the casing 21, is expanded or stretched and forced downwardly over the port 37. The weight of the milk in the inlet chamber and the restricting action of the openings 29 against the flow of the milk results in the expansion of the flexible membrane 25 thereby effectively sealing the port 37 and the whistle 34 from the interior of the outlet chamber 31.

Thus, as long as the milk flow continues to depress the membrane 25 over the port 37 no signal is emitted from the whistle 34 and it is completely inoperative. After the cow has been milked out milk no longer flows through the inlet chamber to the outlet chamber and the flexible membrane 25 is contracted to the position shown in Figure 3 whereupon the port 37 is in communication with the interior of the outlet chamber 31. Since the outlet chamber 31 is under a vacuum depression the incoming atmosphere through the openings 42 and 41 cause the whistle to emit an audible signal whereupon the operator is notified that the milking operation has ended or is about to be ended.

It can now be seen that an improved signalling device for milking machines has been disclosed. The device is simple to manufacture and can readily be cleaned by merely removing the spring clips 27 from their assembled position with the signalling device 20. The signalling device is effective to immediately notify the operator when the milking operation has been completed and thus damage to the animal can be avoided by simply shutting off the milking machine.

It can readily be seen that the objects of the invention have been fully achieved in that modifications and changes may be made without departing from the spirit of the invention as disclosed nor the scope thereof as defined in the appended claims.

What is claimed is:

1. A signal device for a vacuum milking machine or pipe line milking system comprising a casing, a flexible membrane extending transversely within said casing to provide an inlet chamber and an outlet chamber, an inlet connection in communication with said inlet chamber, an outlet connection in communication with said outlet chamber, said membrane having an opening in continual communication with said inlet and outlet chambers, signalling means in said outlet chamber including a whistle having an opening adapted to communicate with the atmosphere, a funnel-shaped member having a portion with an opening disposed in spaced relation with respect to said flexible membrane to provide communication between the whistle openings and the outlet chamber whereby during a vacuum depression in said outlet chamber said whistle emits a signal, said flexible membrane being movable over the opening of the funnel-shaped member for breaking communication between the whistle opening and the outlet chamber during the flow of milk from the inlet chamber through the opening in the flexible membrane to the outlet chamber.

2. A signal device for a vacuum milking machine comprising a casing, a rubber-like membrane suspended transversely within said casing to provide an inlet chamber and an outlet chamber, an inlet connection in communication with said inlet chamber, an outlet connection in communication with said outlet chamber, said membrane having an opening in continual communication with said inlet and outlet chambers, signalling means in said outlet chamber including a whistle having an opening adapted to communicate with the atmosphere, a tubular member enclosing said whistle, said tubular member having a portion with an opening disposed in spaced relation with respect to said flexible membrane to provide communication between the whistle openings and the outlet chamber whereby during a vacuum depression in said outlet chamber said whistle emits a signal, said flexible membrane being expandable over the opening of the tubular member for breaking communication between the whistle opening and the outlet chamber during the flow of milk from the inlet chamber through the opening in the flexible membrane to the outlet chamber.

3. A signal device for vacuum milking machines comprising a casing including opposed shell portions having peripheral flanges, a flexible membrane having an edge portion disposed between the flanges of said casing members, means detachably connecting said flanges in clamping assembly with said flexible membrane to form with said shell portions an inlet chamber and an outlet chamber, said flexible membrane having a plurality of openings to provide for continual communication between said inlet and said outlet chambers, a milk inlet connection on said inlet chamber, a milk outlet connection on said outlet chamber, a whistle disposed in said outlet chamber, said whistle having an opening in communication with the atmosphere, and a tubular member over said whistle, said tubular member having an open end disposed in adjacent spaced relation with respect to said flexible membrane whereby during a vacuum depression within said chambers said whistle is in communication with the chambers and emits an audible signal, said flexible membrane being expandable over the open end of the tubular member for closing the same during the flow of milk through the openings of the flexible membrane from the inlet to the outlet chamber.

4. A signal device for a vacuum milking machine comprising a casing, a rubber-like membrane suspended transversely within said casing to provide an inlet chamber and an outlet chamber, an inlet connection in communication with said inlet chamber, an outlet connection in communication with said outlet chamber, said membrane having an opening in continual communication with said inlet and outlet chambers, signalling means in said outlet chamber including a whistle having an opening adapted to communicate with the atmosphere, said whistle having a portion with a second opening disposed in spaced relation with respect to said flexible membrane to provide communication between the whistle openings and the outlet chamber, whereby during a vacuum depression in said outlet chamber said whistle emits a signal, said flexible membrane being expandable over the second opening of the whistle for breaking communication between the whistle opening and the outlet chamber during the flow of milk from the inlet chamber through the opening in the flexible membrane to the outlet chamber.

5. A signal device for vacuum milking machines comprising a casing including opposed shell portions detachably connected together in sealed assembled relation, an inlet chamber and an outlet chamber within said casing, a flexible membrane suspended within the casing between the inlet and outlet chambers, said membrane having an opening providing communication between the inlet and outlet chambers, a milk inlet connection in communication with the inlet chamber, a milk outlet connection in communication with the outlet chamber, a whistle disposed in the outlet chamber, said whistle having an opening in communication with the outlet chamber and the atmosphere, said whistle being adapted to emit an audible signal during such communication and during a vacuum depression within said outlet chamber, the flexible membrane being expandable over the opening of the whistle for closing the communication between the whistle opening and the chamber during the flow of milk from the inlet chamber through the openings of the membrane to the outlet chamber.

6. A signal device for vacuum milking machines comprising a casing, an inlet chamber and an outlet chamber within said casing, a flexible membrane suspended within the casing between the inlet and outlet chambers, said membrane having an opening providing communication between the inlet and outlet chambers, a milk inlet connection in communication with the inlet chamber, a milk outlet connection in communication with the outlet chamber, a whistle on said casing, said whistle having an opening adapted to communicate with the outlet chamber and the atmosphere, said whistle being adapted to emit an audible signal during communication with the outlet chamber and during a vacuum depression therein, the flexible membrane being expandable over the opening of the whistle for closing the communication between the whistle opening and the chamber during the flow of milk from the inlet chamber through the openings of the membrane to the outlet chamber.

7. A signal device for vacuum milking machines comprising a casing, an inlet chamber and an outlet chamber within the casing, a flexible membrane supported within the casing between said chambers, said membrane having an opening providing communication between said inlet and outlet chambers, an inlet connection in communication with said inlet chamber, an outlet connection in communication with said outlet chamber, and a vacuum controlled signalling means on said casing, said signalling means including a valve member adapted to communicate with the outlet chamber to activate said signalling means during a vacuum depression therein, said flexible membrane being movable to seal the valve member during the flow of milk through the openings in the membrane from the inlet chamber to the outlet chamber thereby rendering the signalling means inoperative.

HAROLD W. HEIN.

References Cited in the file of this patent

UNITED STATES PATENTS

| Number | Name | Date |
| --- | --- | --- |
| 644,179 | Klein et al. | Feb. 27, 1900 |
| 973,704 | Sabroe | Oct. 25, 1910 |
| 1,477,978 | Sabroe | Dec. 18, 1923 |
| 2,321,616 | Perkins | June 15, 1943 |
| 2,461,439 | Perkins | Feb. 8, 1949 |
| 2,549,231 | Perkins | Apr. 17, 1951 |